United States Patent Office 3,427,370
Patented Feb. 11, 1969

3,427,370
RESIN RECOVERY SYSTEM
Hermann Schnell, Krefeld-Urdingen, and Hans Helmut Schwarz, Krefeld-Bockum, Germany, assignors to Farbenfabriken Bayer Aktiengesellschaft, Leverkusen, Germany, a corporation of Germany
No Drawing. Filed July 25, 1963, Ser. No. 297,681
Claims priority, application Germany, Aug. 13, 1962, F 37,583
U.S. Cl. 264—37      11 Claims
Int. Cl. B01d 12/00

This invention relates to synthetic resins and more particularly to a process for the recovery of said resins from solution.

It is generally known to recover synthetic resins from solutions thereof by various techniques such as precipitation, evaporation and centrifugation. In evaporation procedures, process difficulties have been encountered since the solid resin has a tendency to adhere to the heat transfer surfaces and thus cause problems such as overheating and product discoloration. When the evaporation is carried out in enclosed mechanical devices, the swollen heated synthetic resins have clogged device flow passages and/or have stuck to mechanical conveying means; thus impeding continuous passage of the resin through the enclosed system.

To minimize or avoid these difficulties, it has been proposed to evaporate all the solvent from resin solutions by spraying the solution into a mist of a heated non-solvent such as water. In a modification of this procedure, the solvent is substantially completely removed from the solution by mixing the solution under violent agitation conditions with hot water. Neither process has attained any degree of commercial success since the resulting resins usually are agglomerated materials substantially useless in that form and difficult for further working up.

It is, therefore, an object of this invention to provide a process for recovering synthetic resins from solution which is devoid of the foregoing disadvantages. Another object of this invention is to provide a process which is economical to install and maintain and easily adapted to existing systems. A further object of this invention is to provide a process for complete removal of solvent from a resin solution whereby the resulting product is provided in a commercially desirable form. Yet another object of this invention is to provide a process for the recovery of resins from a solution thereof whereby the separated solid resin is in a form easily further processed.

The foregoing objects and others which will become apparent from the following description are accomplished in accordance with this invention, generally speaking, by providing a method for separating a synthetic resin from its solvent wherein a solution of synthetic resin in an organic solvent therefor, water and steam are flowed together through an elongated conduit or pipe under turbulent flow conditions at the point of entry into the conduit. Flow conditions at the point of entry into the conduit are such that the Reynolds number is at least about 5000 and preferably about 20,000. The average residence time in the pipe must be maintained at not less than about $5 \times 10^{-2}$ seconds. Under these conditions together with supplying an aqueous medium, the system remains substantially free of clogging and other corresponding problems thereby allowing the components to freely pass therethrough. If the Reynolds number of about 5000 is not reached, the pipe may be stopped, and if the average residence time in the pipe is less than about $5 \times 10^{-2}$ seconds the product is not free of solvent. The solvent vapor together with the finely divided solid resin and water are then discharged from the end of the pipe and the resin recovered from the aqueous medium by any known manner such as, for example, filtration.

The amount of steam used is to be such that it is sufficient to evaporate the solvent and to raise the water temperature to above the boiling point of the solvent. The evaporation process according to the present invention can, however, also be carried out with the use of water which has a temperature above the boiling point of the solvent and then only the amount of steam necessary for the evaporation of the solvent is required.

With the process, there can be evaporated synthetic resin solutions in organic solvents which contain a water-insoluble synthetic resin, such as polycarbonate, cellulose acetate, chlorinated rubber, polyisoprene, polybutadiene and polymethacrylate solutions. Such resin solutions are described, for example, in the U.S. patent specifications No. 2,114,323 and 3,028,365, in the German Patent No. 528,821, in the BIOS-Final Reports No. 1626, page 18, and in Houben-Weyl, Methoden der Organischen Chemie, Band XIV/1, Makromolekulare Stoffe, page 630 ff.

The synthetic resin is thereby obtained as solid particles with an approximate size of 0.05–3 mm. or as fibers which are substantially free of solvent. An adhesion to the walls of the tube and a blocking of the apparatus does not occur.

The three components can be combined in any desired manner. A device has proved to be especially useful in which the flow pipe, into which the synthetic resin solution and water are sprayed separately or also as a mixture through one or two nozzles, opens into a chamber provided with a steam connection. Of importance for the evaporation process, according to the present invention, are only the mentioned flow conditions in the pipe and not the manner of feeding the components.

Any desired devices can be connected to the pipe which permit the separation of the solvent vapors, synthetic resin particles and water.

The following examples are given for the purpose of illustrating the present invention; parts being by weight unless otherwise specified.

EXAMPLE 1

A mixture of about 100 liters of a 10% solution of a polycarbonate from Bisphenol A in methylene chloride (the preparation of which is similar to that described in U.S. Patent 3,028,365) and about 500 liters water is sprayed hourly through a nozzle into a pipe of about 23 cm. length, the bore of which possesses a diameter of about 7.2 mm. at the point of entry of the mixture and then widens to about 10.5 mm. after a length of about 5 cm. The tip of the nozzle is at a distance of about 0.7 cm. from the mouth of the pipe. At about 20° C. the Reynolds number in the pipe section of about 7.2 mm. diameter amounts to about 21,100. About 50 kg. steam are passed hourly into the intermediate space between the nozzle and the pipe mouth. From the end of the 23 cm. long pipe there sprays out a mixture of solid, sand-like polycarbonate, water and methylene chloride vapor from which the polycarbonate is separated in known manner. The residence time of the mixture in the pipe amounts to about 9.3. $10^{-2}$ seconds calculated at about 20° C.

EXAMPLE 2

About 400 liters water and about 26 liters of a 17.5% solution of chlorinated rubber with a chlorine content of about 64% in carbon tetrachloride, together with about 50 kg. steam are pumped per hour into a pipe of about 23 cm. length, the diameter of which is about 7.2 mm. at the point of entry. The flow here possesses at about 20° C. a Reynolds number of about 19,700 and the residence time amounts to $13 \times 10^{-2}$ seconds. After a length of about 5 cm. the internal diameter of the pipe widens to about 10.3 mm. Solid chlorinated rubber particles leave the pipe together with carbon tetrachloride vapor and water.

EXAMPLE 3

About 500 liters water and about 12 liters of a 10% solution of cellulose acetate, having about 38% acetyl groups in an acetic acid-methylene chloride mixture and about 40 kg. steam are worked up hourly in the same device as described in Example 2. In the mouth of the pipe, the Reynolds number of the flow amounts to 24,600 at about 20° C. The residence time of the mixture in the pipe amounts to $10.8 \times 10^{-2}$ seconds. The cellulose acetate leaves the pipe in finely-divided, solid form.

It is to be understood that this invention is not limited by the examples, but that any of the compositions mentioned above as typical for use in the present invention may be used in place of those set forth in the examples with similar results.

Although the invention has been described in considerable detail in the foregoing, it is to be understood that such detail is solely for the purpose of illustration and that many variations can be made by those skilled in the art without departing from the spirit and scope of the invention except as set forth in the claims.

What is claimed is:

1. A process for removing from a water insoluble synthetic resin solution a solvent for said resin which comprises introducing a mixture of said solution, steam and water into a tubular passage while heating said mixture to a temperature of at least the boiling point of said solvent, said mixture at the point of introduction into said tubular passage under flow conditions having a Reynolds number of at least about 5,000 and a residence time in said tubular passage of at least about $5 \times 10^{-2}$ seconds, volatilizing said solvent from said mixture and obtaining thereby a substantially solvent-free solid resin in an aqueous medium.

2. A process for separating from a water insoluble synthetic resin solution a solvent for said resin which comprises introducing a mixture of said solution, steam and water into a tubular passage under flow conditions having a Reynolds number of at least about 5,000, said mixture having an average residence time in said tubular passage of at least about $5 \times 10^{-2}$ seconds, maintaining said mixture in said tubular passage at a temperature of at least above the boiling point of said solvent, thereby volatilizing substantially all of said solvent from said solution, obtaining thereby a substantially solid resin in an aqueous medium and subsequently removing said solid resin from said aqeous medium.

3. The process of claim 2 wherein said synthetic solution is a cellulose acetate solution.

4. The process of claim 2 wherein said synthetic solution is a chlorinated rubber solution.

5. The process of claim 2 wherein said synthetic solution is a polyisoprene solution.

6. The process of claim 2 wherein said synthetic solution is a polybutadiene solution.

7. The process of claim 2 wherein said synthetic solution is a polymethacrylate solution.

8. The process of claim 2 whereby said mixture at the point of introduction into said tubular passage has a Reynolds number of about 20,000.

9. A process for separating from a polycarbonate solution a solvent for polycarbonate which comprises passing a mixture of said polycarbonate solution, steam and water into an elongated conduit, said mixture at the point of introduction into said elongated conduit having a flow Reynolds number of at least about 5,000, said mixture having a residence time in said conduit of at least about $5 \times 10^{-2}$ seconds, maintaining said mixture throughout the process at a temperature of at least above the boiling point of said solvent, to volatilize said solvent from said polycarbonate solution, thereby obtaining polycarbonate particles dispersed in an aqueous medium and subsequently filtering said polycarbonate particles from said aqueous medium.

10. A process for separating methylene chloride from a polycarbonate solution which comprises passing a mixture of said polycarbonate solution, steam and water into an elongated conduit, said mixture at the point of introduction into said elongated conduit having a flow Reynolds number of at least about 5,000, said mixture having a residence time in said conduit of at least about $5 \times 10^{-2}$ seconds, maintaining said mixture throughout the process at a temperature of at least above about 40° C. to volatilize said methylene chloride from said polycarbonate solution, thereby obtaining polycarbonate particles dispersed in an aqueous medium and subsequently filtering said polycarbonate particles from said aqueous medium.

11. A method for separating a polycarbonate from its solvent which comprises flowing together through an elongated conduit separately polycarbonate in an organic solvent therefor, steam and water, the flow rate of the resulting mixture at the point of entry into said conduit being such that the Reynolds number is at least about 5,000, sufficient steam being included to evaporate substantially all of said solvent while the mixture is in the conduit, said conduit having dimensions whereby the residence time therein is not less than about $5 \times 10^{-2}$ seconds, and thereafter separating the resulting particles of polycarbonate from the water in which it is suspended.

References Cited

UNITED STATES PATENTS

| | | | |
|---|---|---|---|
| 2,423,033 | 6/1947 | Beau | 260—2.3 |
| 2,915,482 | 12/1959 | Nagel et al. | 260—2.3 |
| 2,921,038 | 1/1960 | Gunther | 260—2.3 |
| 3,048,218 | 8/1962 | Gunther | 260—2.3 |
| 3,108,082 | 10/1963 | Riehl et al. | 260—2.3 |
| 2,567,802 | 9/1951 | Carr et al. | 260—2.3 |
| 2,783,213 | 2/1957 | Le Beau | 260—2.3 |
| 2,794,006 | 5/1957 | Naudain et al. | 260—2.3 |

DONALD J. ARNOLD, *Primary Examiner.*

U.S. Cl. X.R.

106—196, 198; 260—2.3